United States Patent
Nguyen et al.

[11] Patent Number: 6,012,907
[45] Date of Patent: Jan. 11, 2000

[54] FLOW-REGULATING ARRANGEMENT FOR A HYDRAULIC TRANSPORTING DEVICE

[75] Inventors: Van Doan Nguyen, Neu-Anspach; Peter Breuer, Friedrichsdorf, both of Germany

[73] Assignee: Luk Fahrzeug-Hydraulik GmbH & Co. KG, Homburg, Germany

[21] Appl. No.: 08/986,720

[22] Filed: Dec. 8, 1997

[30] Foreign Application Priority Data

Dec. 9, 1996 [DE] Germany ............... 196 52 420

[51] Int. Cl.$^7$ .............. F04B 49/00; F04B 23/00
[52] U.S. Cl. .............. 417/300; 417/297; 417/441
[58] Field of Search ............... 417/297, 300, 417/441

[56] References Cited

U.S. PATENT DOCUMENTS

| | | | |
|---|---|---|---|
| 2,938,469 | 3/1960 | Lauck | 417/213 |
| 3,207,077 | 9/1965 | Ziegler et al. | 417/300 |
| 3,295,752 | 1/1967 | Bellmer | 417/310 |
| 3,671,148 | 6/1972 | Reeve | 417/295 |
| 4,311,161 | 1/1982 | Narumi et al. | 137/117 |
| 4,325,677 | 4/1982 | Nonnenmacher | 417/49 |
| 4,395,203 | 7/1983 | Takada | 417/282 |
| 4,480,962 | 11/1984 | Niemiec | 417/53 |
| 4,566,863 | 1/1986 | Goto et al. | 417/295 |
| 4,597,718 | 7/1986 | Nakano et al. | 417/300 |
| 4,708,598 | 11/1987 | Sugita et al. | 417/295 |
| 5,378,112 | 1/1995 | Nasvytis | 417/213 |
| 5,513,960 | 5/1996 | Uemoto | 417/300 |
| 5,685,332 | 11/1997 | Overdiek et al. | 137/503 |
| 5,860,797 | 1/1999 | Fujimura et al. | 417/440 |

FOREIGN PATENT DOCUMENTS

| | | | |
|---|---|---|---|
| 528 254 | 2/1993 | European Pat. Off. | |
| 44 00 684 | 7/1994 | Germany | 417/300 |
| 44 26652 | 11/1995 | Germany | 137/503 |
| 2 277 306 | 10/1994 | United Kingdom | |

*Primary Examiner*—Charles G. Freay
*Assistant Examiner*—Paul L. Ratcliffe
*Attorney, Agent, or Firm*—Fitch, Even, Tabin & Flannery

[57] ABSTRACT

A flow-regulating arrangement for a hydraulic transport device such as a vane-cell pump includes partial-transport flow throttles which operate independently of one another and which are arranged in parallel to deliver output of the hydraulic transporting device to a hydraulic load. One of the partial transport flow throttles responds to the pressure difference between working pressure of the hydraulic transporting device and pressure within a pressure chamber internal to the device.

8 Claims, 5 Drawing Sheets

FLOW-REGULATING ARRANGEMENT FOR A HYDRAULIC TRANSPORTING DEVICE

BACKGROUND OF THE INVENTION

1. Field of the Invention

The invention relates to a flow-regulating arrangement for a hydraulic transporting device such as a vane-cell pump.

2. Description of the Related Art

Flow-regulating arrangements of this general type are known. For example, in DE 44 26 652 C1, a flow-regulating arrangement is described, which has two partial-transport flow throttles, arranged parallel to each other and operating independently. At this point, a total transport flow is formed by partial-transport flows influenced by the partial-transport flow throttle. Due to the partial-transport flow throttles, acting independently of each other, a disconnection of the control signals of the two partial-transport flow throttles takes place. By means of the two partial-transport flow throttles, acting independently of each other and arranged parallel to each other, a transport flow regulation is carried out which makes a lowering of the operating curve of the transport flow possible even in the case of high system pressures. With the known flow-regulating arrangement, it is disadvantageous that the pressure difference, with which the pressure head-dependent partial-transport flow throttle is controlled, is not great enough in certain operational situations for achieving an effective throttling, or that no adequate pressure difference results due to the pump construction.

SUMMARY OF THE INVENTION

For this reason, it is an object of the present invention to create a flow-regulating arrangement having a simple construction and with which these disadvantages do not occur.

In accordance with the invention, this objective is achieved by means of a flow-regulating arrangement with the characteristics described herein. One of the partial-transport flow throttles is controlled by a pressure difference between the working pressure of the hydraulic transporting device and the pressure inside a pressure chamber of the hydraulic transporting device. Accordingly, it is possible to utilize the maximally possible transport flow throttle. Accordingly, with an increase in the number of revolutions of the hydraulic transporting device (preferably in the form of a vane-cell pump), the pressure difference, which controls the second partial-transport flow throttle, increases to such an extent that the same can be utilized for the adjustment of a decreasing operating curve of the transport flow of the entire hydraulic transporting device. In this way, with the flow-regulating arrangement known from DE 44 26 652 C1, it is easier to adjust the operating curve of the total transport flow, independent of system pressures, even in the case of a high number of revolutions and to produce an essentially constant or even decreasing volume flow.

In a preferred embodiment of the invention, provisions are made wherein the pressure difference between the working pressure and a pressure range most distant from the partial-transport flow throttle is tapped inside the pressure chamber of the hydraulic transporting device. Thus, the maximally highest possible pressure difference is available to control the partial-transport flow throttle. Preferably, the pressure inside the pressure chamber is tapped at an optimal location of the pressure nodule where the highest pressure occurs.

Additional advantageous embodiments of the invention result from the remaining characteristics cited in the subclaims.

DETAILED DESCRIPTION OF THE PREFERRED EMBODIMENT

Figure 1:
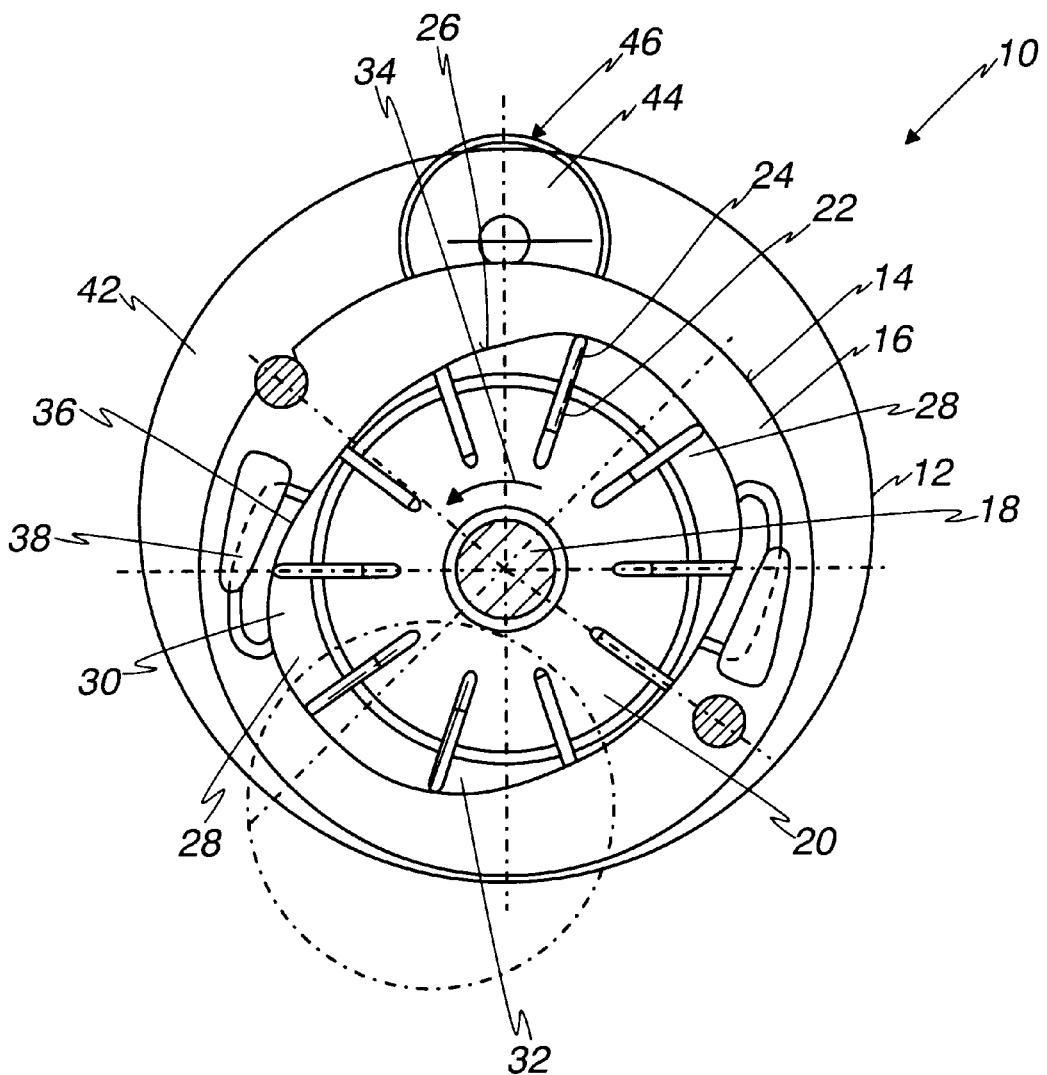
FIG. 1 shows a vane-cell pump according to the principles of the present invention, with the outer housing partly broken away.

In FIG. 1, a vane-cell pump 10 is shown partly broken away. The vane-cell pump 10 has a pump housing 12 in which a recess 14 of a ring 16 is arranged. Within the ring 16, on a drive shaft 18, a rotor 20 is arranged in a rotary manner. The rotor 20 is centrally arranged with respect to the recess 14 or the ring 16. The rotor 20 has radially extending slits 22 in which radially movable vanes 24 are guided. In the example shown, the rotor 20 has a total of ten vanes 24 arranged uniformly across the periphery of the rotor 20.

The ring 16 has an inner contour 26 forming two diametrically opposite pump chambers 28. Preferably, both pump chambers 28 are constructed identically. Construction and function of the vane-cell 10 are generally known, and will not be described in detail herein.

The pump chamber 28 forms a suction chamber 30 and a pressure chamber 32. With reference to a direction of counterclockwise rotation, as indicated by an arrow 34, the pressure chamber 32 is arranged downstream of the suction chamber 30. The suction chamber 30 is connected via a suction opening 36 with a suction chamber 38 which, in turn, is connected with a suction connection of the vane-cell pump 10 via a connection line.

Figure 2:
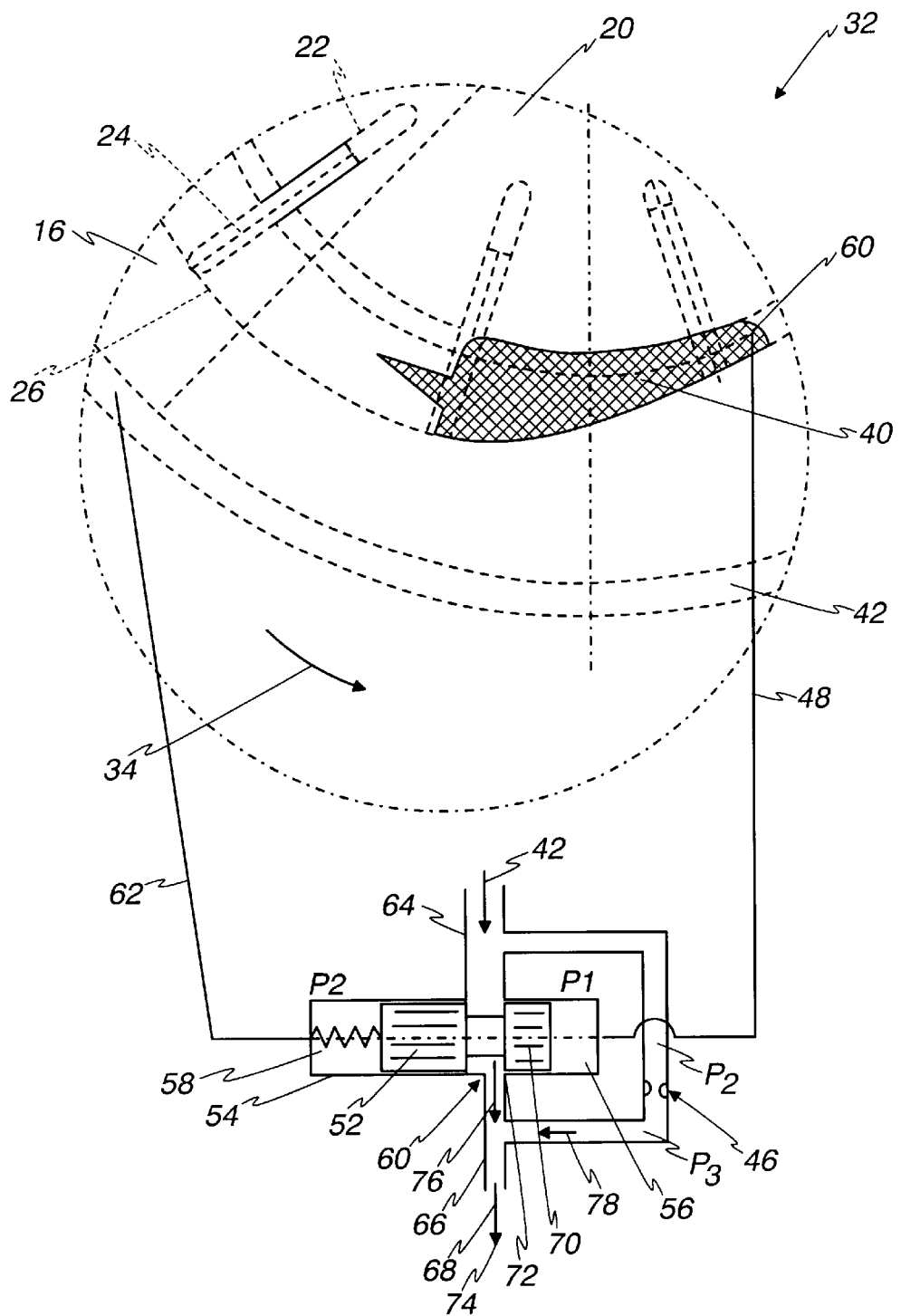
FIG. 2 shows a portion of FIG. 1 on an enlarged scale.

The area of the pressure chamber 32 encircled by dot-dash lines in FIG. 1 is shown enlarged in FIG. 2. As can be seen, a pressure nodule 40 forms an outlet opening to a pressure collection chamber 42, which is connected with the pressure connection of the vane-cell pump 10. The pressure collection chamber 42 is formed by an annular chamber gripping around the ring 16. The pressure collection chamber 42 is connected with all (in this case with two) pressure nodules 40 of the pressure chambers 32. The pressure collection chamber 42 is hydraulically connected with a transport-flow-regulating valve 44.

The transport-flow-regulating valve 44 may, for example, have an axial extension of a valve piston that grips through a restrictor bore hole of a stationary restrictor. This extension, gripping through the restrictor, in accordance with the present invention, forms a first partial-transport flow throttle 46. This operates in a path-dependent manner. Construction of the transport-flow-regulating valve 44 is generally known, and will not to be addressed in greater detail.

The pressure nodule 40 is connected via a control line 48, as schematically indicated, with a second partial-transport flow throttle 50. The partial-transport flow throttle 50 is indicated schematically, and may, for example, be integrated into the transport-flow-regulating valve 44. The partial-transport flow throttle 50 has a piston valve 52 that is movably mounted in a valve bore 54 axially mounted against the force of a spring 55. The piston valve 52 is smaller in its axial extension than the axial extension of the valve bore 54. In accordance with the illustration shown in FIG. 2, this arrangement separates a first pressure chamber 56 from a second pressure chamber 58. The first pressure chamber 56 is connected with the pressure nodule 40 via the control line 48. The control line 48 is coupled to a rear (downstream, as seen in the direction of rotation 34) portion 60 of the pressure nodule 40.

The second pressure chamber 58 is connected via a control line 62 with the pressure collection chamber 42. A first channel 64 opens into the valve bore hole 54, and is also connected with the pressure collection chamber 42 (not shown in FIG. 2). Opposite thereto, an additional channel 66 communicates with the pressure connection 68 of the vane-cell pump 10 leading to a load. The valve piston 52 includes a control collar 70 having a guiding edge 72 assigned to the channel 66. The valve piston 52 is guided in the valve bore 54 in a sealing manner, so that no direct connection exists between the pressure chambers 56 or 58 and the channels 64 and 66.

The first partial-transport flow throttle 46, which is schematically shown, is connected with the pressure collection chamber 42 and also with the pressure connection 68. In this way, the partial-transport flow throttles 46 and 50 are arranged parallel with respect to each other and operate independently of each other.

In the pressure chamber 56, there is a pressure (P1) that corresponds to the pressure present at the end 60 of the pressure nodule 40. In the pressure chamber 58, there is a pressure (P2) that corresponds to the working pressure of the vane-cell pump 10 present in the pressure collection chamber 42. This pressure (P2) is simultaneously present at one side of the partial-transport flow throttle 46. The other side of the partial-transport flow throttle 46 is charged with a pressure (P3) that corresponds to the pressure occurring at the hydraulic load, i.e., the pressure connection 68.

It becomes clear that the partial-transport flow throttle 50 is controlled by a working pressure of the vane-cell pump 10, present in the pressure collection chamber 42, and by a pressure (P1) present at the end 60 of the pressure nodule 40. Here, the control line 48 is connected with only one pressure nodule 40 of the vane-cell pump 10 at a point which is (three-dimensionally) the farthest removed from the transport-flow-regulating valve 44 (compare FIGS. 1 and 2). The partial-transport flow throttle 46 is controlled by the pressure difference that results from the working pressure (P2) of the vane-cell pump 10, present in the pressure collection chamber 42, and the pressure (P3) occurring at the load.

By means of the parallel arrangement of the partial-transport flow throttles 46 and 50, a total volume flow 74 results, which is composed of partial volume flows 76 and 78. The partial volume flows 76 and 78 are determined by the position of the partial-transport flow throttles 46 and 50. The partial-transport flow throttle 50 preferably operates in a pressure-head-dependent manner, while the partial-transport flow throttle 46 is preferably operated in a path-dependent manner. According to additional examples, however, the partial-transport flow throttle 46 may operate in a pressure-head-dependent manner or may take the form of a stationary partial-transport flow throttle (so-called stationary throttle).

During the operation of the vane-cell pump 10, the rotor 20 is made to carry out a rotating motion via the drive shaft 18. As a result, the vanes 24 undergo a radial movement in accordance with the inner contour 26 of the ring 16. In the area of the suction chambers 30, the vanes 24 are extended so that between two adjacent vanes 24, chambers with increased volume are formed. A medium at the suction opening 36 to be transported, such as hydraulic oil, is suctioned. Due to the increase in this volume, during continuing rotation of the rotor 20, the valves 24 enter the pressure chamber 32, where they are driven radially into the slits 22. Accordingly, the volume between two adjacent vanes 24 is reduced. As a result, a pressure is built up so that the conveyed medium is driven out via the pressure nodules 40. Depending on the number of pressure chambers 32 of the vane-cell pump 10, partial flows are gathered in the pressure collection chamber 42. This working pressure (P2) of the vane-cell pump 10, present in the pressure collection chamber 42, is used to control both partial-transport flow throttles 46 and 50. A pressure (P1) builds up in the pressure nodule 40, particularly at its end 60. This pressure is higher than the pressure (P2) in the pressure collection chamber 42 and results in a pressure difference between the pressure (P1) and the pressure (P2). Since the pressures (P1 and P2) engage the valve piston 52 in opposite directions, the piston is displaced towards the left or right in accordance with this pressure difference. In the initial state, the valve piston 52 is pressed toward the right by the force of the spring 55. If the pressure at the end 60 of the pressure nodule 40 rises, the valve piston 52 is displaced against the force of the spring 55 towards the left. Since simultaneously the pressure inside the pressure collection chamber 42 increases, not only the force of the spring 55, but also the pressure (P2), act against the pressure (P1). By adjusting the force of the spring 55, the pressure ratio (P1–P2) can be set. In this manner, the valve piston 52 opens a connection between the channel 64 and the channel 66, so that a certain partial volume flow 76 results. The second partial volume flow 78 is adjusted, via the partial-transport flow throttle 46.

With an increased number of revolutions of the rotor 20, the pressure (P1) at the end 60 of the pressure nodule 40 further increases, so that the pressure difference between the pressures (P1 and P2) becomes greater. Thus, a further displacement of the valve piston 52 towards the lift takes place, so that the guiding edge 72 of the control collar 70 crosses the channel 66 axially and so that the free penetration surface between the interior chamber 58 and the channel 66, on the one hand, and the interior chamber 58 and the channel 64, on the other hand, is reduced. Accordingly, a throttle location with a variable cross section is formed, whose free cross section is dependent upon the pressure difference (P1–P2).

Figure 4:
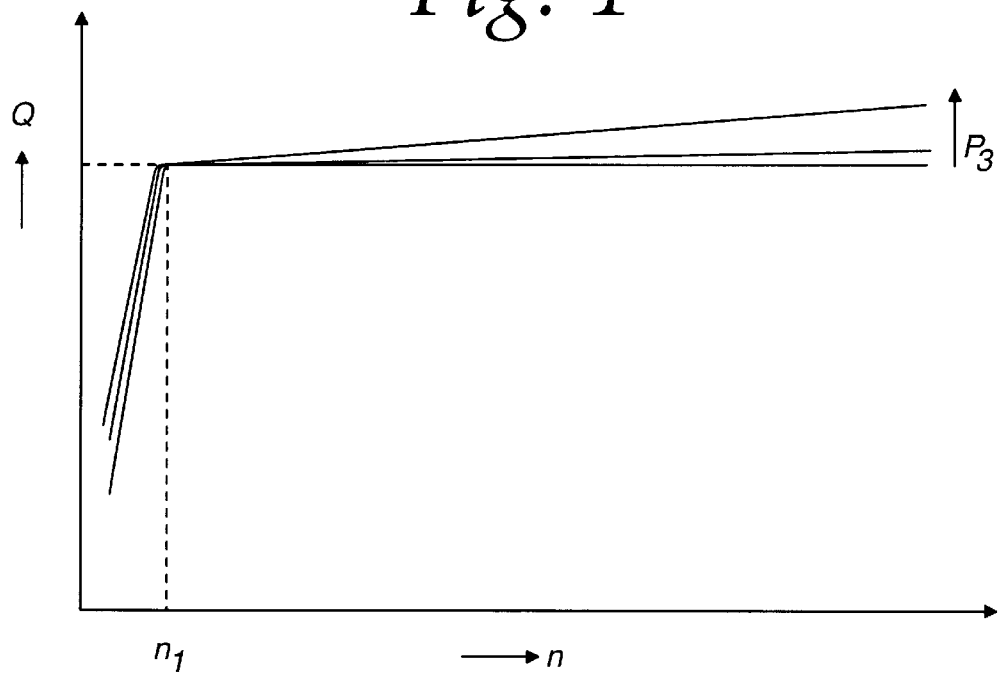
FIGS. 4–7 are graphs showing operating performance of the vane-cell pump.

Due to the superposition of the partial volume flows 78 and 76, which are variable in accordance with the pressure differences (P1–P2) or (P2–P3), a total volume flow 74 occurs. By means of the two partial-transport flow throttles, operating independently of and parallel to each other, full volume flows 74 with a great decrease in the upper range of the number of revolutions of the vane-cell pump 10 can be achieved. In particular, the partial-transport flow throttle 50 is controlled with the highest pressure (P1) available in the vane-cell pump 10 at that end 60 of the pressure nodule 40 that is farthest away from the transport-flow-regulating valve 44. See, for example, the operating curves of the transport flow shown in FIG. 4.

Figure 3:
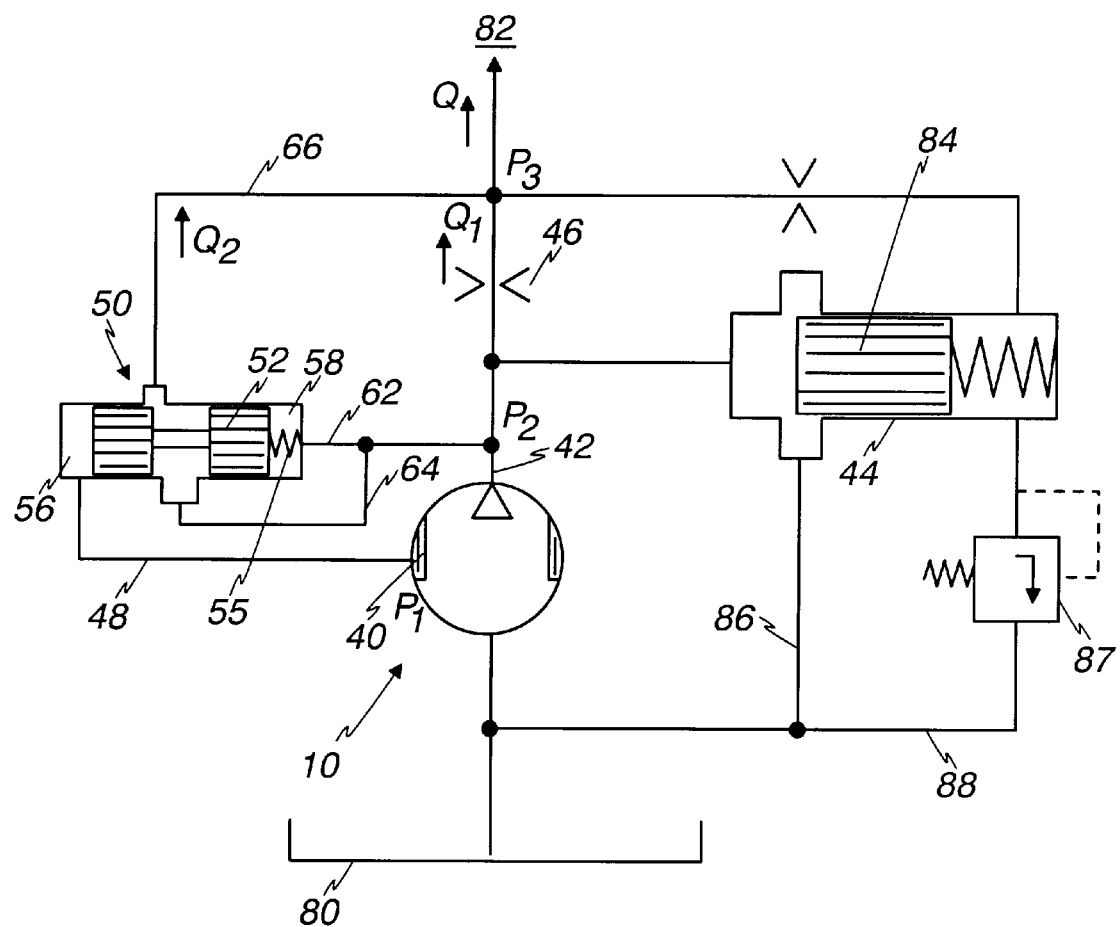
FIG. 3 is a schematic diagram of the flow-regulating portion thereof.

In FIG. 3, a schematic diagram of the flow-regulating arrangement shown in FIGS. 1 and 2 for a hydraulic transporting device, in this case a vane-cell pump (10), is shown. The circuit diagram is used to again clarify the control function of the partial-transport flow throttles (46 and 50). Parts identical to those in FIGS. 1 and 2 are assigned the same reference symbol and, despite the variation in the presentation, are not explained again.

During its operation, the vane-cell pump 10 produces a transport flow that is dependent upon the number of revolutions of the vane-cell pump 10. If the vane-cell pump 10 is used, for example, in a conventional manner as a steering booster pump mounted in motor vehicles, the pump will be driven by the combustion engine of the motor vehicle. A hydraulic oil is pumped from a tank 80 to the steering system 82, i,e., the hydraulic load. The first partial-transport flow throttle 46 is arranged within the line path leading from the vane-cell pump 10 to the load 82. The control line 48 leads from the pressure nodule 40 to the second partial-transport flow throttle 50. The pressure collection chamber 42, in which the pressure (P2) is present, is connected, on the one hand, via the lines 62 and 63 with the second transport flow throttle 50 (see also FIG. 2) and, on the other hand, is connected via the first partial-transport flow throttle 46 with the load 82. In accordance with the pressure conditions occurring between the pressures (P1, P2, P3), particularly between the pressure differences between the pressure (P1) and the pressure (P2) and, on the other hand, the pressure (P2) and the pressure (P3), the partial volume flows (Q1) 78 and (Q2) 76 are influenced, so that the total volume flow (Q) 74 results. The partial volume flows (Q1) and (Q2) combine in this way into the total volume flow (Q).

The valve piston 84 of the transport-flow-regulating valve 44 forms a booster connection 86 to the suction side of the vane-cell pump 10 or the tank 80 when the pressure (P2) excessively increases. Furthermore, a relief valve jet 86 is provided. When the working pressure (P2) of an adjustable minimum pressure is exceeded, this jet also opens and frees a connection 88 to the tank 80.

In FIGS. 4 to 7, performance curves of the transport flow are shown. These flows can be achieved by means of the flow-regulating arrangement of the present invention. With the performance curves of the transport flow, respectively, the total volume flow (Q) is shown in L/min over a number of revolutions (n) in U/min of the vane-cell pump (10). A number of performance curves of the transport-flow per figure is entered, which corresponds to varying pressures (P). The pressure value indicated here corresponds to the working pressure (P3) of the vane-cell pump (10). By means of the varying transport flow performance curves, it is to be made clear that despite a varying pressure, the performance curves, on the one hand, remain within a relatively narrow margin of tolerance, while the number of revolutions (n) remains in a relatively constant area of the volume flow (Q) or can be reduced to lower values of the volume flow (Q).

Figure 5:
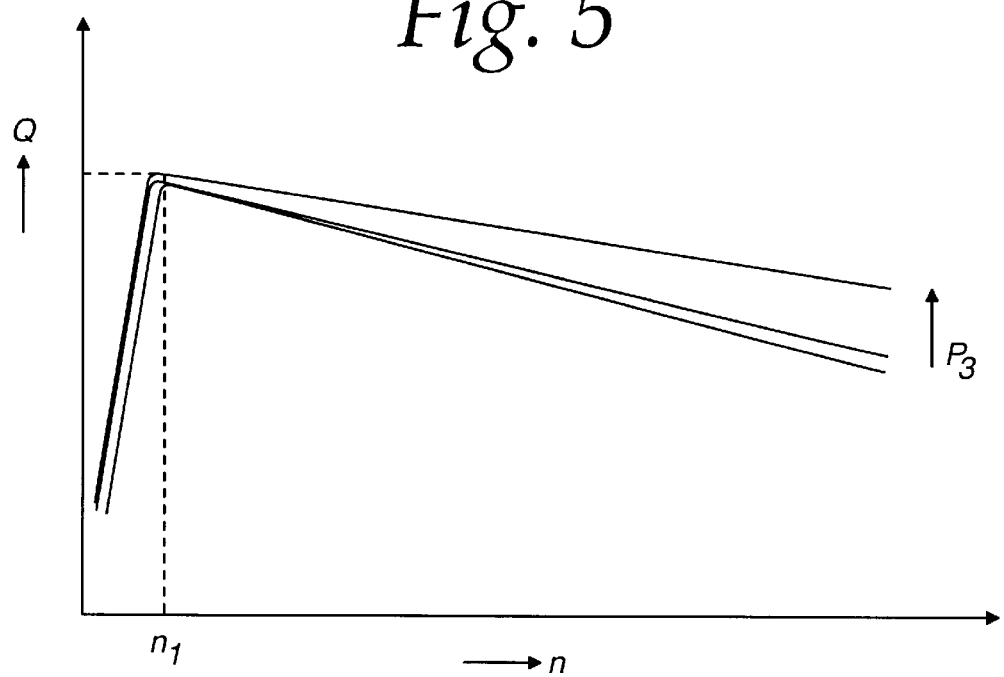

The varying operating curves in FIGS. 4 to 7 result from a variation in the selection or adjustment of the partial-transport flow throttles. In this way, for example, (see FIG. 4) an increase in the volume flow (Q) to a value at a certain number of revolutions (n1) is possible, which is then kept relatively constant, independently of the pressure (P3). As shown in FIG. 5, according to an additional example, it is possible that upon exceeding the number of revolutions (n1), the volume flow (Q) decreases relatively constant, independently of the pressure (P3) and within a narrow margin of tolerance.

Figure 6:
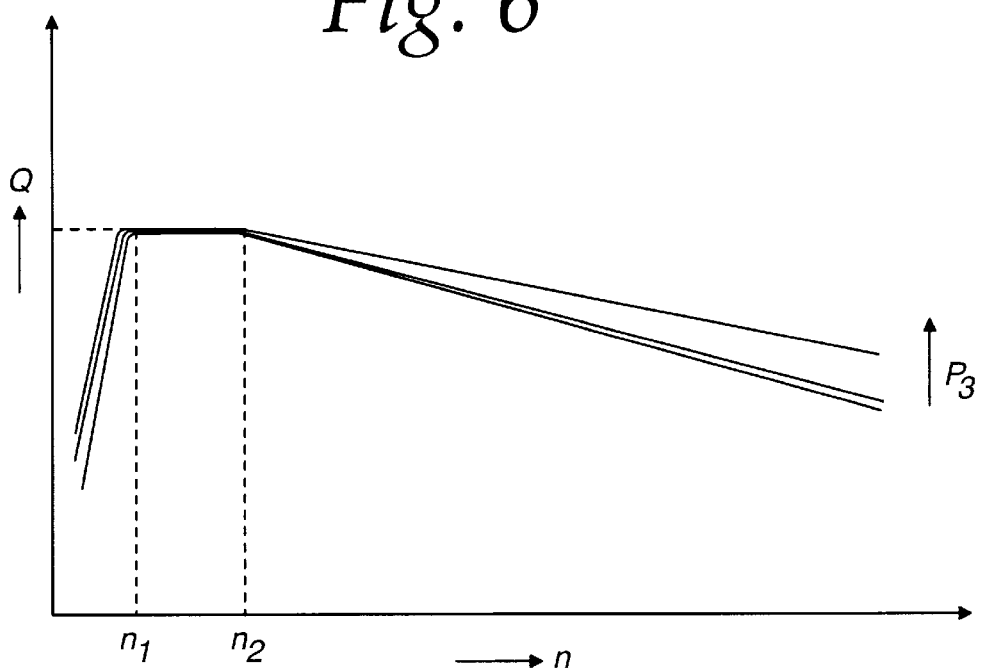
Figure 7:
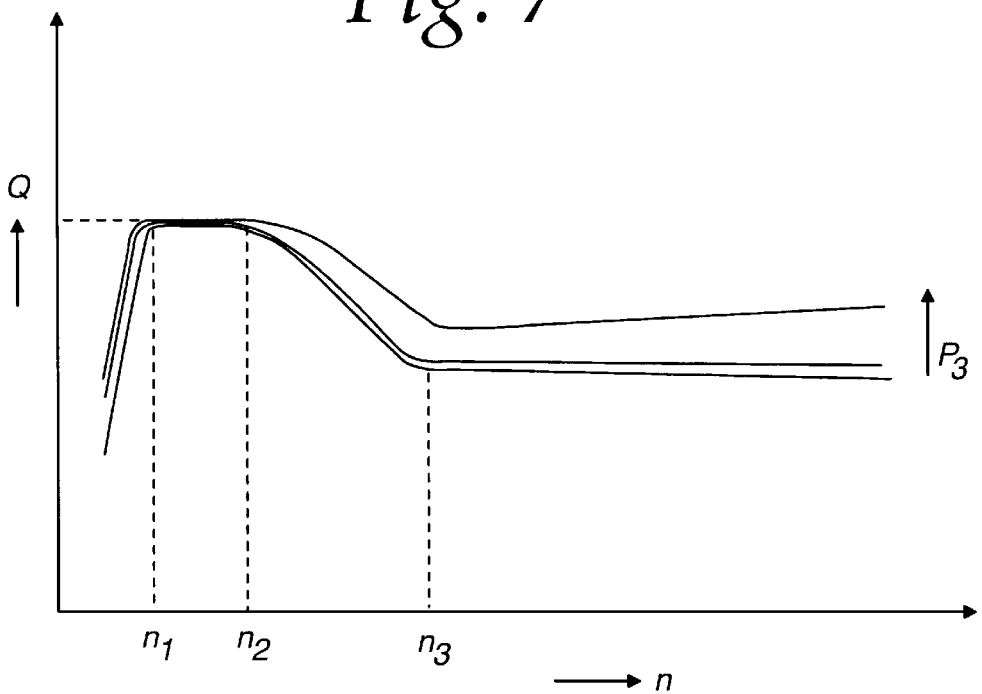

An additional example shown in FIG. 6 shows the possibility of keeping the volume flow (Q) relatively constant, independently of the pressure (P3), within a limited range between the number of revolutions (n1) and (n2), in order to subsequently obtain a relatively constant decrease within a narrow margin of tolerance. Furthermore, in accordance with the example shown in FIG. 7, it is possible to adjust the volume flow (Q), again independently of the pressure (P3), to a number of revolutions ranging from (n1) to (n2) to a relatively constant state in order to then lower the volume flow (Q) to the number of revolutions (n3) and, in the case of numbers of revolutions above (n3), to adjust the volume flow (Q) within a relatively narrow margin of tolerance to an essentially constant state.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A flow-regulating arrangement for a hydraulic transporting device operating with a working pressure and having a pressure chamber and a plurality of partial-transport flow throttles operating independently of each other and arranged parallel to each other, for the purpose of directing a transport flow from the hydraulic transporting device to a hydraulic load, wherein at least one of the partial-transport flow throttles is controlled by a pressure difference between a working pressure of the hydraulic transporting device and a chamber pressure inside the pressure chamber of the hydraulic transporting device.

2. The arrangement of claim 1 further comprising a flow-regulating valve spaced from the pressure chamber.

3. The arrangement of claim 1 wherein the pressure chamber defines a pressure nodule comprising the chamber pressure defining said pressure difference.

4. The arrangement according to claim 3 wherein the pressure nodule has an end portion whereat the chamber pressure defining said pressure difference is located.

5. The arrangement of claim 2 wherein said partial transport flow throttles are integrated with the flow-regulating valve to form a common assembly therewith.

6. The arrangement of claim 1 wherein at least one of said partial transport flow throttles operates in a pressure-head-dependent manner.

7. The arrangement of claim 1 wherein at least one of said partial transport flow throttles operates in a path-dependent manner.

8. The arrangement of claim 1 wherein at least one of said partial transport flow throttles comprises a stationary throttle.

* * * * *